US012679715B2

(12) United States Patent
Massie et al.

(10) Patent No.: US 12,679,715 B2
(45) Date of Patent: Jul. 14, 2026

(54) WATER TREATMENT DISTRIBUTOR

(71) Applicant: Franklin Electric Co., Inc., Fort Wayne, IN (US)

(72) Inventors: Shawn B. Massie, St. Paris, OH (US); Nathanael P. Calloway, Fort Wayne, IN (US); Dennis Glenn Babbs, Colon, MI (US); Jose Gabriel Davila Rangel, Fort Wayne, IN (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 202 days.

(21) Appl. No.: 18/543,021

(22) Filed: Dec. 18, 2023

(65) Prior Publication Data

US 2024/0208793 A1 Jun. 27, 2024

Related U.S. Application Data

(60) Provisional application No. 63/476,540, filed on Dec. 21, 2022.

(51) Int. Cl.
*B67D 3/00* (2006.01)

(52) U.S. Cl.
CPC .... *B67D 3/0083* (2013.01); *B67D 2210/0001* (2013.01); *B67D 2210/00034* (2013.01);
(Continued)

(58) Field of Classification Search
CPC .......... B67D 3/0083; B67D 2210/0001; B67D 2210/00034; B67D 2210/00049; B67D 2210/00149
See application file for complete search history.

(56) References Cited

U.S. PATENT DOCUMENTS

| | | | | |
|---|---|---|---|---|
| 5,534,144 | A | 7/1996 | Hemstrom et al. | |
| 10,443,224 | B1 * | 10/2019 | Sykes | E03F 5/22 |
| 2006/0048756 | A1 * | 3/2006 | Ikeya | F02M 37/14 210/234 |

FOREIGN PATENT DOCUMENTS

| | | | |
|---|---|---|---|
| CN | 219156596 U | * | 6/2023 |
| DE | 1946082 A1 | | 3/1971 |

(Continued)

OTHER PUBLICATIONS

International Search Report and Written Opinion received for PCT Patent Application No. PCT/US23/84526, mailed on May 24, 2024, 22 pages.

(Continued)

*Primary Examiner* — Donnell A Long
(74) *Attorney, Agent, or Firm* — Faegre Drinker Biddle & Reath LLP

(57) ABSTRACT

A distributor tube assembly for a water softener system has upper and lower baskets that provide superior performance in a universal form factor that allows it to be installed in standard tanks with standard-sized ports or openings. The upper and lower baskets provide spiral-shaped slots and varying angled slot profiles which enhance water softening and media regeneration processes. The upper basket has a taper which expands upwardly, while the lower basket has a taper which expands downwardly, and each of these tapers enhances the respective functions of the upper and lower baskets by forcing more flow through the wider regions that have more flow area than the narrower regions. The baskets may each be assembled from halves to facilitate manufacturing of the slot design and allow for an inverted-taper design of the lower basket while reducing manufacturing costs.

25 Claims, 17 Drawing Sheets

(52) U.S. Cl.
CPC .............. *B67D 2210/00049* (2013.01); *B67D 2210/00149* (2013.01)

(56) References Cited

FOREIGN PATENT DOCUMENTS

| | | | |
|---|---|---|---|
| FR | 3027823 | A1 | 5/2016 |
| WO | 00/09265 | A1 | 2/2000 |

OTHER PUBLICATIONS

Invitation to Pay Additional Fees received for PCT Patent Application No. PCT/US23/84526, mailed on Mar. 1, 2024, 3 pages.

* cited by examiner

WATER TREATMENT DISTRIBUTOR

RELATED APPLICATIONS

The present U.S. non-provisional patent application is related to and claims priority benefit of prior-filed U.S. provisional patent application having the same title, Ser. No. 63/476,540, filed on Dec. 21, 2022, the entire contents of which hereby being expressly incorporated herein by reference.

TECHNICAL FIELD

The present disclosure relates to water treatment systems and, in particular, to distributor baskets used in connection with distributor tubes for water softener ion exchange vessels or water filters.

BACKGROUND

Water softeners are commonly used to remove certain minerals from mineral-rich, or "hard" water. The water softener system then delivers treated or "soft" water to the end user. Undesirable minerals include calcium, magnesium, manganese and iron. Water softener systems may employ an ion exchange process to bond these undesirable minerals to other materials, such as salts. Such ion exchange may be accomplished by providing an ion exchange resin bed containing resin materials designed to promote the ion exchange process. The resin bed is housed in a resin tank which is filled with some of the water from the water source. As this water passes across the resin bed, ions of calcium and other positively charged ions are exchanged with ions held by the resin (typically sodium). Undesirable hardness minerals are thereby removed from the water and replaced with ions from the resin.

Distributor baskets are used to physically separate the material contained within the tank from pathways into the control valve or plumbing downstream of the system, while still allowing water to pass through these regions to promote ion exchange and the regeneration of the resin bed.

Ion exchange resin capacity is gradually depleted as the ion exchange process is repeated over time. Water treatment controls may be provided as part of a water softener system to periodically regenerate the resin contained in the resin tank. This regeneration can be accomplished, for example, by the reversal of the above-described softening process. That is, the undesirable ions formerly bonded to the resin during the water softening process (such as calcium) are chemically replaced with sodium or similar ions. In some systems, this reversal is accomplished by passing a regenerant solution of sodium or potassium chloride through the resin bed.

The regeneration process may include a number of steps, such as: i) a backwash cycle to remove turbidity from the resin bed; ii) a brine draw cycle to introduce the regenerant to the resin bed; iii) a rinse to eliminate chlorides in the finished water; and iv) a brine refill cycle to prepare a brine solution for the next regeneration.

As the system operates, the sodium or potassium ions from the brine solution will be exchanged in the resin bed to positively ionize the resin beads. Over time the concentration of the brine solution will diminish and will need to be restored to continue softening hard water. Typically, the brine solution is located in a brine storage tank with a user-accessible interior cavity, such that the user can periodically refill the storage tank with additional water softening salt/potassium as the brine concentration level drops.

SUMMARY

The present disclosure provides a distributor tube assembly for a water softener system in which upper and lower baskets provide superior performance in a universal form factor that allows it to be installed in standard tanks with standard-sized ports or openings. The upper and lower baskets provide spiral-shaped slots and varying angled slot profiles which enhance water softening and media regeneration processes. The upper basket has a taper which expands upwardly, while the lower basket has a taper which expands downwardly, and each of these tapers enhances the respective functions of the upper and lower baskets by forcing more flow through the wider regions that have more flow area than the narrower regions. The baskets may each be assembled from halves to facilitate manufacturing of the slot design and allow for an inverted-taper design of the lower basket while reducing manufacturing costs.

In one form thereof, the present disclosure provides a distributor basket including a first basket half having a first plurality of slots arranged in a spiral pattern, and a second basket half having a second plurality of slots arranged in the spiral pattern. The first basket half and the second basket half each have respective mating edges which, when abutted to one another upon assembly, form an assembled basket with a tapered outer surface and a correspondingly tapered inner cavity.

In another form thereof, the present disclosure provides a distributor tube assembly for a water softener. The assembly includes an upper basket having an open lower end and an open upper end, the upper basket defining a tapered outer profile upwardly expanding from the open lower end toward the open upper end. The assembly further includes a distributor tube having an upper tube end portion coupled to the open lower end of the upper basket and a lower tube end portion opposite the upper tube end portion. The assembly further includes a lower basket having an open upper end and a capped lower end, the lower tube end portion coupled to the open upper end of the lower basket, the lower basket defining a tapered outer profile downwardly expanding from the open upper end of the lower basket to the capped lower end.

In yet another form thereof, the present disclosure provides a water softener system, including an ion exchange tank having an upper tank end with a tank opening and a closed lower tank end, a controller fluidly connected to the ion exchange tank, a brine tank in selective fluid communication with the ion exchange tank via the controller, and a distributor tube assembly. The distributor tube assembly includes a distributor tube having an upper tube end portion and a lower tube end portion, an upper basket coupled to the upper tube end, the upper basket sized to be passed through the tank opening, the upper basket having a first plurality of slots arranged in a spiral pattern, and a lower basket coupled to the lower tube end, the lower basket sized to be passed through the tank opening, the lower basket having a second plurality of slots arranged in a spiral pattern and a third plurality of slots arranged along a lower surface thereof.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional and drawn to scale.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings.

Figure 1:
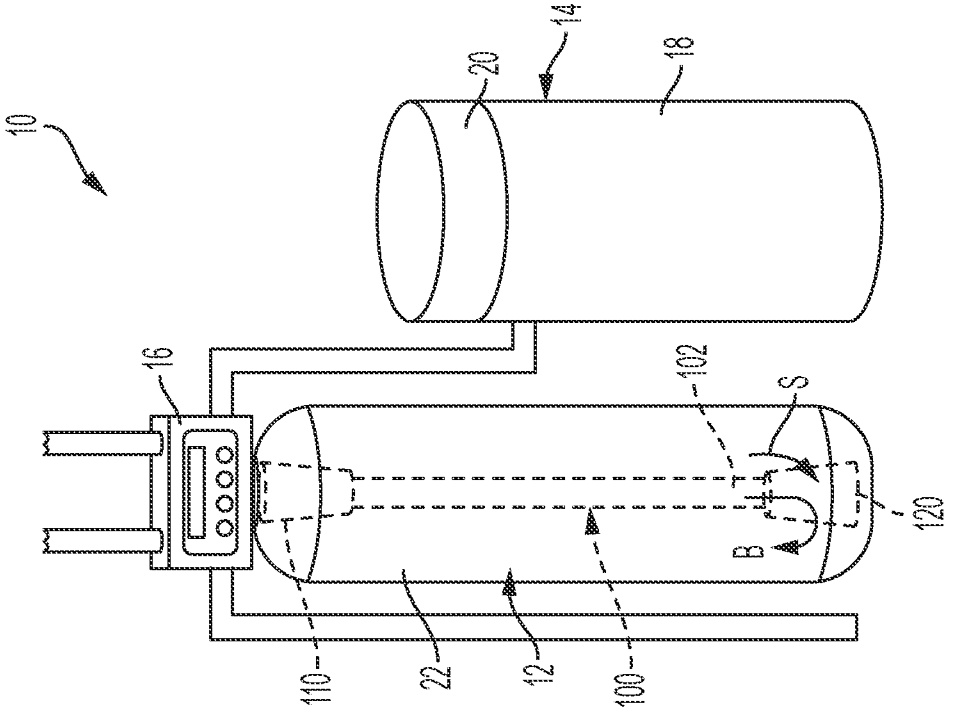
FIG. 1 is a schematic view of a water softener system including a distributor tube assembly made in accordance with the present disclosure.

For purposes of the present disclosure, directionality will be referenced in the context of atypical use of a water softening system, such as system 10 shown in FIG. 1. Thus, an "upper" or "top" feature is considered to be vertically above a "lower" or "bottom" feature as viewed in a typical water softener installation.

Although water softener system 10 is used herein to illustrate aspects of the present disclosure, other applications are envisioned. For example, some water softening systems and control units utilize multiple tanks. These tanks can be identical such that a controller, such as controller 16 described below, can switch between tanks such that softened water will always be available while the other tank regenerates. Another application for twin-tank control units is to have one tank operate as a dedicated filter for applications with very high amounts of insoluble solids and materials in the water. One such example is an iron filter, which is used in installations with incoming water with high iron content. For filtration, the tank setup can be the same as the ion exchange tank 12 described below, except the water softening resin 22 is replaced with filter media. Depending on the filter media selected for the application, the filter media particles can be smaller than water softening resin, meaning that typically filter media tanks require gravel to prevent the filter media from passing through the distributor baskets due to the typically larger slot width sizes. Distributor baskets made in accordance with the present disclosure, such as baskets 110 and 120 described herein, can be used in such filter media applications, and can obviate the need for gravel as described below with regard to tank 12.

Turning to FIG. 1, water softener system 10 is shown including ion exchange tank 12 which is selectively fluidly connected to brine and media tank 14 via controller 16, which may include a system of electronically-operated control valves. Tank 12 contains a quantity or bed of softening resin 22. In the illustrated embodiment, brine tank 14 includes a body 18 and a removable lid 20, such that a user may remove the lid 20 to add water softening media, such as salt (e.g., sodium chloride or potassium chloride) to the interior of body 18 for regeneration operations as described herein.

During a normal service operation (i.e., when softened water is called for), untreated pressurized water flows into ion exchange tank 12 containing softening resin 22 via the control valve of controller 16 and flows downward through distributor tube assembly 100, and outwardly from the lower basket 120 along path B shown in FIG. 1, bypassing upper basket 110. The untreated water then flows upwardly through the resin 22, exchanging hardness ions for salt ions, and through the upper basket 110 as softened water. The softened water then flows out of tank 12 through the valves of controller 16 and further downstream to a final delivery point. During this type of operation, upper basket assembly 110 prevents softening resin 22 contained within tank 12 from entering distributor tube assembly 100 by its series of slots 130, shown in FIGS. 2 and 7, which are small enough to prevent solid filter media or softening resin 22 from entering but large enough to allow water to flow at a sufficiently high rate. As described in detail below, the flow from slots 140 provides a long, tortuous flow path for hard water through tank 12 and its resin media, ensuring a highly effective and efficient softening process.

A water softener has a service position and five regeneration cycles: backwash, brine draw, slow rinse, fast rinse, and fill. In backwash, water is directed to the bottom of the tank 12 through lower basket 120, upward through the resin bed 22, and removes turbidity by flowing through the valve of controller 16 and to drain.

In downflow brine draw, the brine solution from brine tank 14 flows into the valve of controller 16 and down distributor tube 100. The brine solution then flows outwardly from the lower basket 120 and into the resin bed 22, along path B, where the brine exchanges its sodium or potassium ions for hardness minerals and positively ionizes the resin bed 22. The mineral-rich brine solution then flows up through the upper basket 110, through the valve of controller 16, and out to drain.

Upflow brine draw follows the same process as downflow brine draw, but flows in the opposite direction of the service position, i.e., along path S. In upflow brining, brine flows through the valve of controller 16 and outwardly into the top of the resin tank 12 through upper basket 110. Brine then flows down the side of the tank through resin bed 22, exchanging sodium and potassium ions for hardness minerals, and then through the lower basket 120 and up through distributor tube 100 where it flows back to the valve of controller 16 and out to drain.

In slow rinse, fresh water is directed to the resin bed by the valve of controller 16 and slowly removes the remaining brine solution from the resin bed 22 and sends it to drain.

In fast rinse, the opposite path is followed as the slow rinse cycle, but at a higher flow rate through the resin bed 22 from top to bottom in order to compact the resin bed and remove any remaining mineral-rich brine.

In fill, water is directed through the brine draw line into brine tank 14 and fills the brine tank 14 where the water softening salt is stored, preparing for the next brine cycle.

To effectively distribute water and the brine solution in the various cycles, controller 16 may include the aforementioned valve structure operable to selectively direct flows of fluid between tank 14 to tank 12, according to instructions programmed into controller 16. In some embodiments, the valve structure may be a reciprocating piston, a rotating disc or poppets. As described in detail below, the flow from lower basket 120 through slots 140 provides thorough mixing and agitation of the resin by the incoming brine, ensuring a highly effective and efficient regeneration process by increasing the flow path of the brine, thereby increasing the contact chance with the resin to exchange ions.

Figure 2:
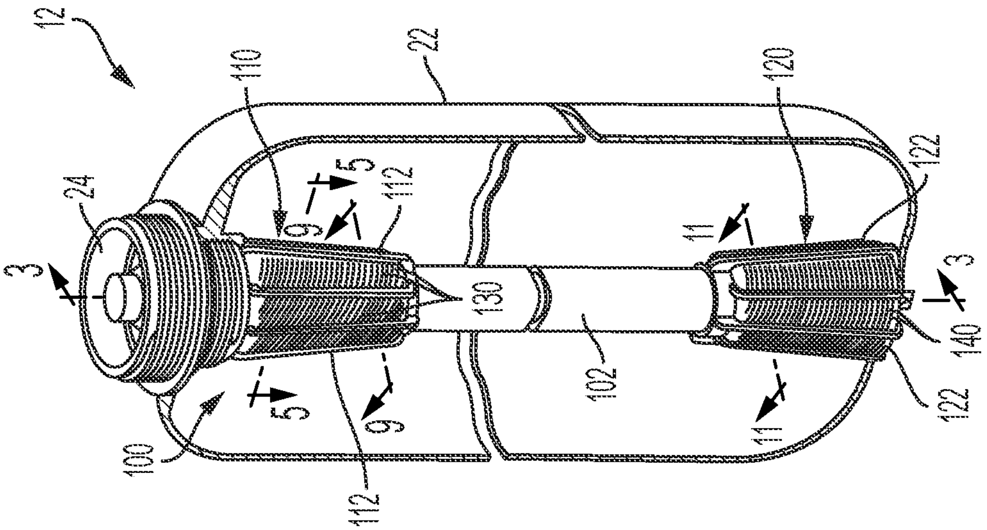
FIG. 2 is a perspective, cutaway view of an ion exchange tank including the distributor tube assembly shown in FIG. 1.
Figure 3:
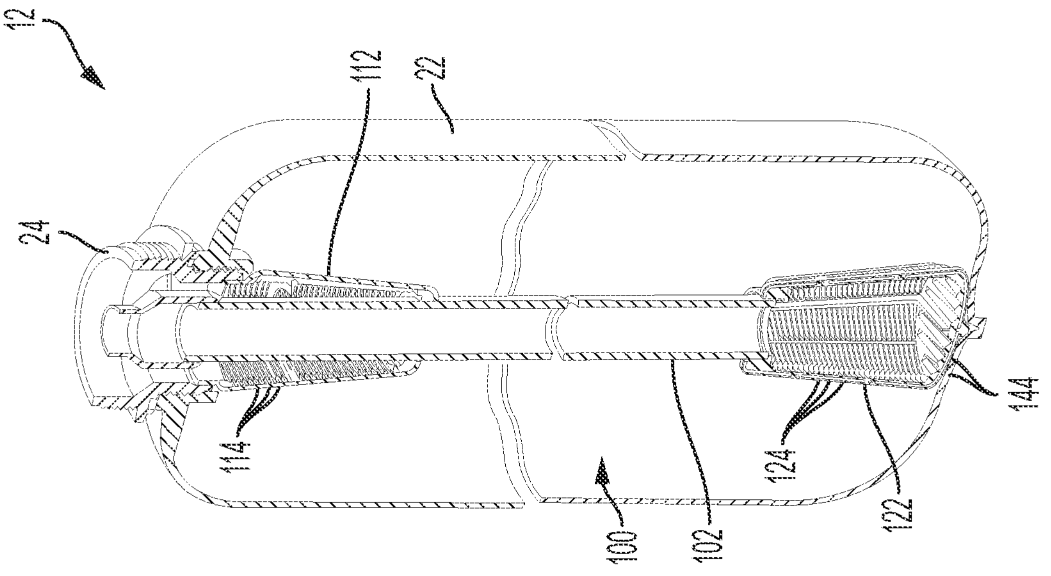
FIG. 3 is a cross-section view of the ion exchange tank and distributor tube assembly shown in FIG. 2, taken along the line 3-3.

FIGS. 2 and 3 illustrate the ion exchange tank 12 with the distributor tube assembly 100 received therein. For clarity, the lengths of the tank 12 and distributor tube 102 have been abbreviated in FIGS. 2 and 3.

Figure 9:
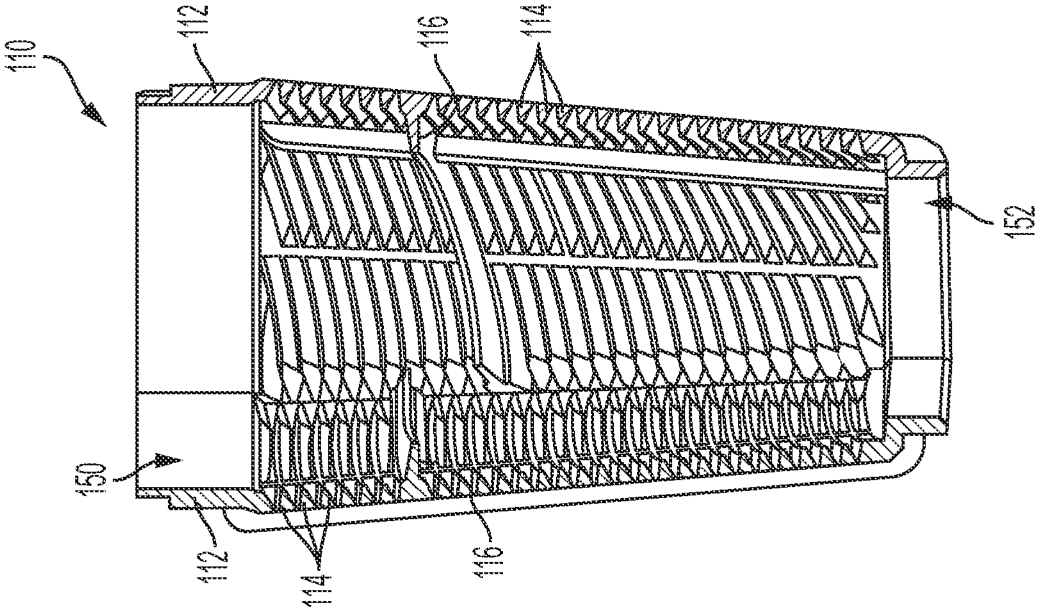
FIG. 9 is an elevation, section view of the top basket assembly shown in FIG. 7, taken along the line 9-9 of FIG. 2.

Upper basket assembly 110 is coupled to the upper end portion of tube 102, with tube 102 received through an open lower end of basket assembly 110 via bottom opening 152 (FIG. 9). The upper portion of tube 102 also extends upwardly through the interior cavity of basket assembly 110, as shown in FIG. 3, and to a further coupling with an inner conduit of tank cap 24 or directly to a compatible control valve. The outer conduit of tank cap 24, which surrounds the inner conduit as shown, is in direct fluid communication with the open upper end of the upper basket 110 via top opening 150 (FIG. 9). In this way, the interior of basket 110 is fluidly connected to the outer conduit of cap 24 but fluidly isolated from the interior of distributor tube 102.

Moreover, the coupling formed between the bottom opening 152 and the tube 102 is a fluid-tight coupling, such as a fixed connection. The coupling formed between the inner conduit of the cap 24 and the upper end of the tube 102 is similarly fluid-tight, e.g., fixed. The coupling between the upper open end 150 of basket 110 and the outer conduit of cap 24 may be made by a bayonet-style fitting using connection grooves 28, shown in FIG. 7, which may be configured to connect to industry-standard caps used in connection with control valves of controller 16, or to any other such caps which may connect directly with compatible controls valves.

Bottom basket assembly 120 is coupled to the bottom end of the distributor tube 102 via its top opening 154 (FIG. 11), which forms an open upper end of the basket 120. As with other fluid couplings described herein, this coupling may be fluid-tight, e.g., fixed. Unlike upper basket 110, however, fluid is allowed to flow freely between the interior of distributor tube 102 and the inner cavity defined by the lower basket 120. As shown in FIG. 1 and described herein, such flows may go in a water softening/downflow brining/slow rinse/fill/backwash direction B or a fast rinse/upflow brining direction S. Also unlike upper basket 110, lower basket 120 includes a capped lower end 156 which is not adapted to receive any conduit and only allows for controlled fluid flows therethrough via slots 144, as further described below.

The fluid couplings described above may be direct-fit for ¾" and 1" PVC tube, as shown, or adapters may be used to join smaller tube diameters to baskets 110, 120. Joints, whether direct tube-to-basket or further including an adapter, may use adhesives to create a fluid-tight seal.

Upper and lower basket assemblies 110, 120 have identical tapered profiles but are oriented 180 degrees from one another. As best seen in FIG. 9, upper basket 110 has a taper which expands upwardly from its open lower end 152 to its open upper end 150, while lower basket 120, shown in FIG. 11, has a taper which expands downwardly from its open upper end 154 to its capped lower end 156. Each of these tapered profiles may define a generally frustoconical outer surface and a correspondingly frustoconical cavity and inner surface of upper and lower basket assemblies 110, 120. These tapered arrangements allow for a continuous transition from higher-volume, lower-velocity flows through slots 130, 140 (FIG. 2) at wider regions to lower-volume, higher-velocity flows at narrower regions. As described further below, these differing flows across the longitudinal extent of each basket assembly 110, 120 may be leveraged to gain performance advantages. The taper angle of each basket assembly 110, 120 may be consistent around the entire periphery thereof, and may be between 4 degrees and 5 degrees from vertical. In one exemplary embodiment, for example, the taper angle may be 5 degrees for both basket assemblies 110, 120.

Figure 7:
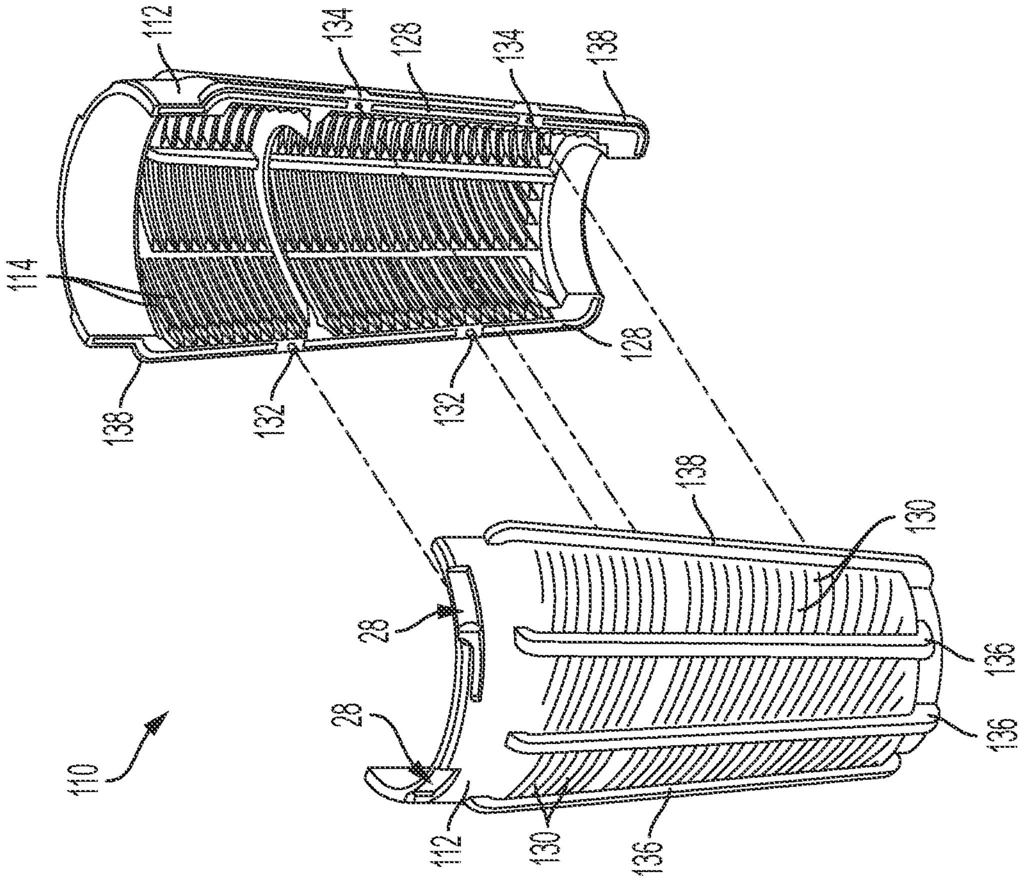
FIG. 7 is a perspective, exploded view of a top basket assembly of the distributor tube assembly shown in FIG. 2.

As best seen in FIG. 7, upper basket assembly 110 is formed from two halves 112 which can be fixed to one another. Each of the two halves 112 may be identical for production efficiency using a common mold. Each half 112 may include a pair of mating edges which can be abutted to the corresponding mating edges of the other half upon assembly. For example, joiner ribs 138 may be configured to abut one another and be joined along their longitudinal extents, such as by a welding operation. Each of the joiner ribs 138 may be made of a weldable plastic material. Sonic welding may be used to integrally join each of the pairs of abutting ribs 138. One or more sonic welding concentrators 128 may be provided along the longitudinal extent of the joiner ribs 138, positioned on the abutting surfaces thereof, to facilitate the welding operation.

Each basket half 112 may also include a pair of alignment pins 132 formed on one of the joiner ribs 138 and a corresponding pair of alignment holes 134 formed on the other, opposing joiner rib 138. When the halves 112 are abutted to create the basket assembly 110, the pins 132 from one half 112 fit into the holes 134 of the other, abutting half. This creates an integrated alignment features to ensure dimensional accuracy and stability of the finished basket assembly 110 during the joining (e.g., welding) process. Although two pins 132 and holes 134 are shown on each half 112, a single pin 132 and hole 134, or a plurality of pins 132 and holes 134, may be used.

Figure 8:
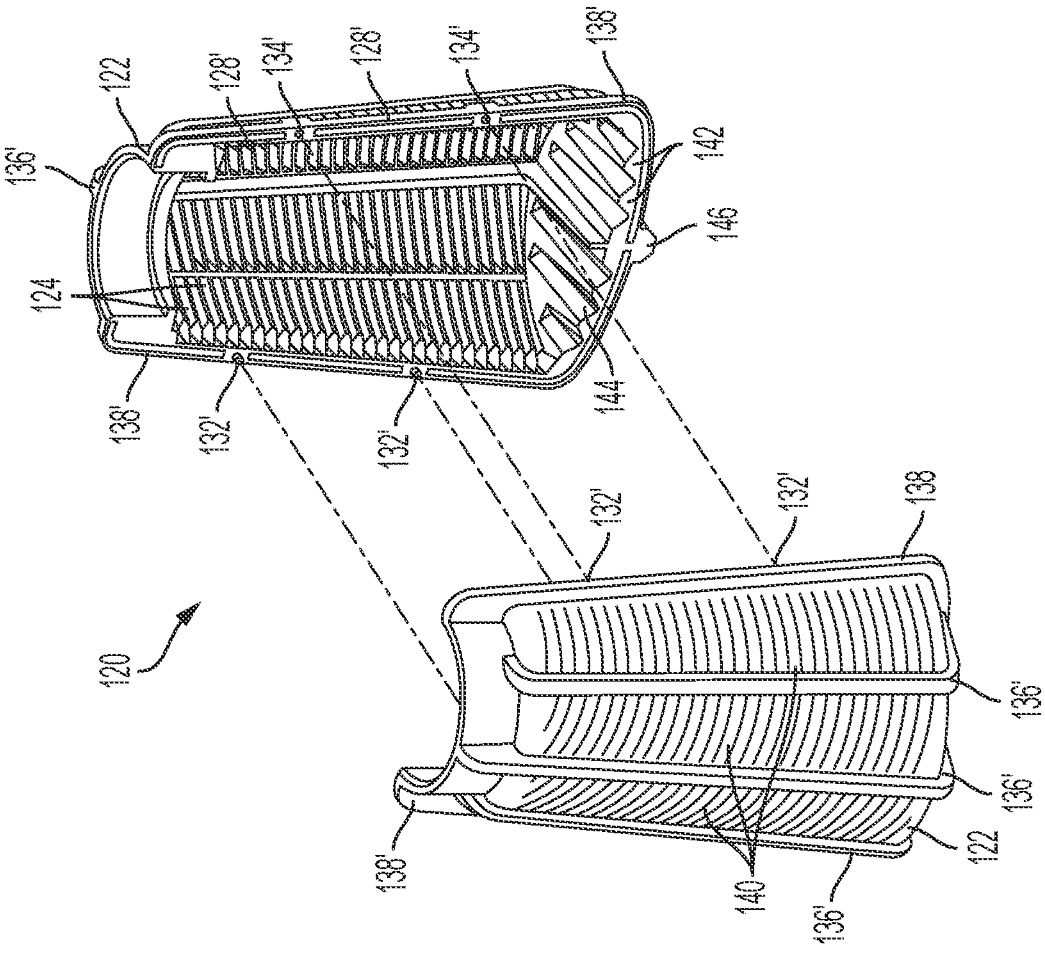
FIG. 8 is a perspective, exploded view of a bottom basket assembly of the distributor tube assembly shown in FIG. 2.

Turning to FIG. 8, lower basket assembly 120 is formed from two halves 122 which can be fixed to one another in the same manner as halves 112 described above. Each of the halves 122 may be identical to one another. All the features pertaining to the joining (e.g., welding) of the lower basket halves 122 are analogous to the features pertaining to the joining of the upper basket halves 112, and reference numbers of halves 122 correspond to reference numbers of analogous structures in halves 112, except with a prime ("'") added thereto. For conciseness, the function and structure of these analogous features is not repeated here, it being understood that their function and structure is the same as described herein.

Referring again to FIG. 7, upper basket assembly 110, and in particular each of the halves 112 thereof, includes a series of slots 130 formed in a helical, spiral pattern extending across the axial extent of the outer surface of the basket 110. These spiral-shaped slots produce a spiral flow when pressurized fluid passes through from the inner cavity of basket 110 outwardly into the ion exchange tank. Additionally, the spiral-shaped slots 130 extend generally side-to-side, i.e., a majority of the slots 130 extend around the entire periphery from one joiner rib 138 to the other, opposing joiner rib 138. A small minority of the slots 130 which do not extend the entirety of the distance between the two joiner ribs are the slots 130 near the axial ends of each of the halves 112.

This side-to-side orientation of the slots 130 produces a fluid flow that is predominantly radially outward. At the same time, the helical/spiral pattern of the slots 130 directs exiting water slightly downwardly along a spiraling pathway. This has been found to avoiding high-pressure blockage from recently-exited fluid and thereby promote high fluid throughput through slots 130. At the same time, this radially-outward, spiraling and swirling fluid flow maximizes the contact time between fluid exiting basket 110, which may be water to be treated during a water softening process, and the fluid contained within tank 12, which may contain resin for ion exchange with the water to be treated. This maximization of the contact time promotes an efficient and effective treatment process, as detailed further below.

Turning back to FIG. 8, lower basket assembly 120 also includes slots 140 which are formed the same manner and arrangement as slots 130. That is, a series of slots 140 form a spiral pattern oriented in a generally side-to-side configuration which causes exiting fluid to form a radially-outward, spiraling and swirling fluid flow. Slots 140, due to their helical/spiral pattern, also promote high throughput in a similar manner as slots 130.

However, slots 140 also provide additional functions and features arising from their use at the bottom of the ion exchange tank 12. In particular, the spiral slots 140 cooperate with the downwardly-expanding tapered outer surface of lower basket assembly 120, and with additional slots 144 formed in the capped lower end 156, to effect a highly efficient and effective water softening and regeneration cycles as described above.

During regeneration, it is desirable to maximize agitation of the ion exchange media in the presence of the brine solution, which in turn maximizes the ability of the brine solution to remove "grains" or particles of minerals previously bound to the ion exchange media during water softening. In particular, the media at the bottom of the tank 12 should be agitated and circulated in the brine solution to effect a full and complete regeneration cycle.

The configuration of slots 140, together with the arrangement of fins 124 which channel fluid to slots 140 as described below, provides maximized agitation and high-performance regeneration. During regeneration, brine is pumped downwardly through distributor tube assembly 100 as described herein, causing an internal fluid pressure within lower basket assembly 120. This pressure causes brine to spray radially outwardly, circling in a spiral pattern similar to the fluid exiting slots 130 as described above. At the same time, pressurized water sprays downwardly through slots 144 formed in the capped lower end 156 of basket 120. A bottom spacer 146 (FIG. 11) protrudes downwardly below slots 144, and is configured to center and position hold the slots 144 above the adjacent bottom surface of the ion exchange tank 12. The flow through slots 144 agitates the media at the bottom of the tank 12, causing it to lift off the bottom surface of the tank 12 and thorough clean the bottom surface of residue. This agitated media then enters the swirling stream of brine issuing from the slots 130.

Figure 11:
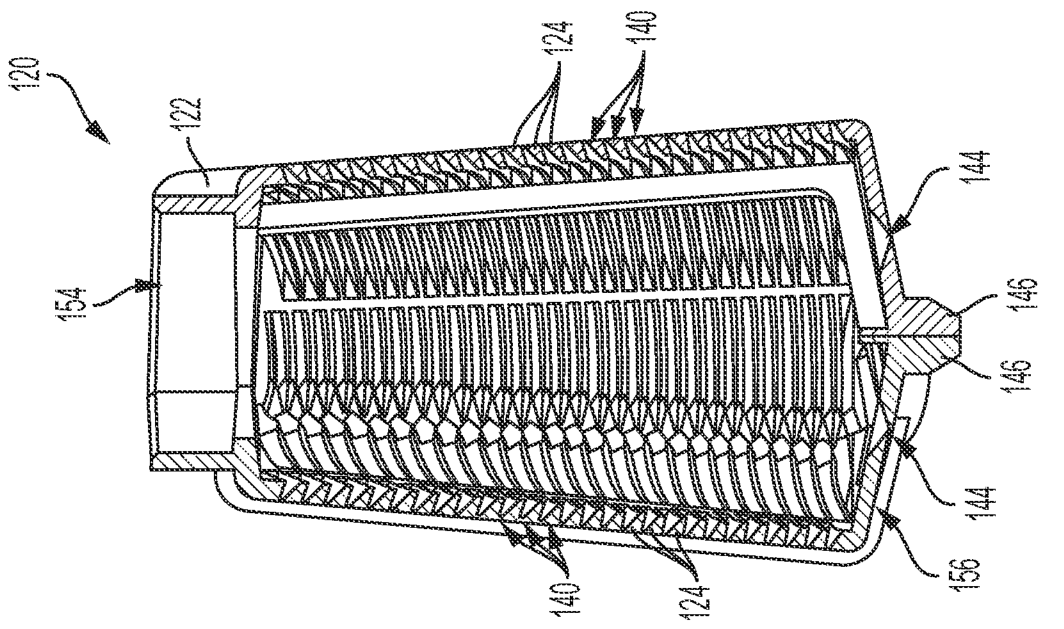
FIG. 11 is an elevation, section view of the bottom basket assembly shown in FIG. 8, taken along the line 11-11 of FIG. 2.
Figure 12:
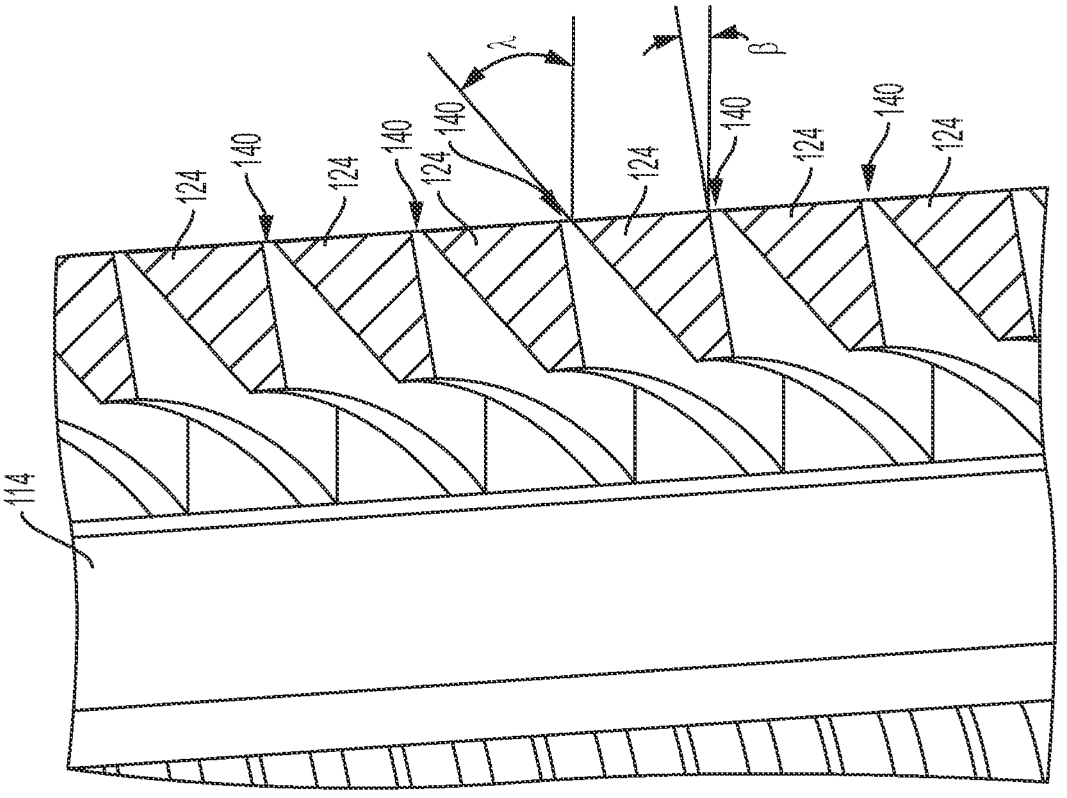
FIG. 12 is an enlarged elevation view of a portion of the bottom basket assembly shown in FIG. 11.

The fluid exiting slots 140 also has a strong and turbulent uplift, which causes the media carried by the flow to be drawn up to the surface of the fluid within tank 12 before falling back, thereby maximizing contact with the regenerative brine solution. FIG. 11 shows an arrangement of fins 124 which channel water from the inner cavity of basket 120 toward the slots 140. FIG. 12 shows an enlarged view of some of the fins 124 and slots 140. As illustrated in FIG. 12, each fin has an upper surface defining angle λ relative to a horizontal plane, and a lower surface defining angle β relative to the horizontal plane. However, due to the curved slot openings 140 the angles will vary in order to keep the rib thickness and opening uniform. Within this variability, the upper surface of the slots 140 defines an angle of 3 degrees with respect to the curvature of the slot, and the lower surface of slots 140 defines a constant width relative to the adjacent slot opening to ensure uniform shutoff surfaces for all slot profiles in the design. This lower surface creates angle λ which is significantly positive, such as between 23.8 degrees and 48.4 degrees from horizontal along the curved slots 140. Angle β is created by the upper surface of fins 116 and nearer to horizontal, such as between 3.6 degrees and 40.5 degrees from horizontal along the curved slots 140. Angles λ and β increase as the slot curve gets steeper. In the illustrated cross-section, angle λ is 44 degrees and angle β is 12 degrees. These upwardly-sloped angles cooperate with the narrowing fluid channel defined by neighboring fins 124 to accelerate fluid upwardly and outwardly through slots 140, creating the turbulent uplift described above.

Additionally, the downwardly-expanding taper of lower basket assembly 120 also facilitates the upward lift of fluid and media throughout the fluid column contained within tank 12. Given that the fluid pressure within the inner cavity of basket 120 is essentially constant throughout its volume, fluid speeds are higher at the top of the basket 120 while fluid volumes are higher at the bottom of the basket 120.

In particular, the slots 140 in the top half of the basket 120 represent a smaller cumulative surface area of compared to the slots 140 in the bottom half thereof. Slots 144 of lower end 156 further increase the cumulative surface area available for fluid egress at the bottom portion of basket 120. As a result, fluid speeds increase while fluid volumes decrease from the bottom to the top of the basket 120. During a regeneration process, the large volume of flow at the bottom helps "stir" or agitate the media settled at the bottom of the tank 12. As this media get swept up in the spiral flow from slots 140, its is allowed to gradually accelerate along its upward trajectory by the increasingly fast flows created by the increasingly constricted area of slots 140. By the time the media reaches the top of the basket 120, it has accumulated enough momentum to be carried all the way to the top of the fluid column as noted above.

Figure 10:
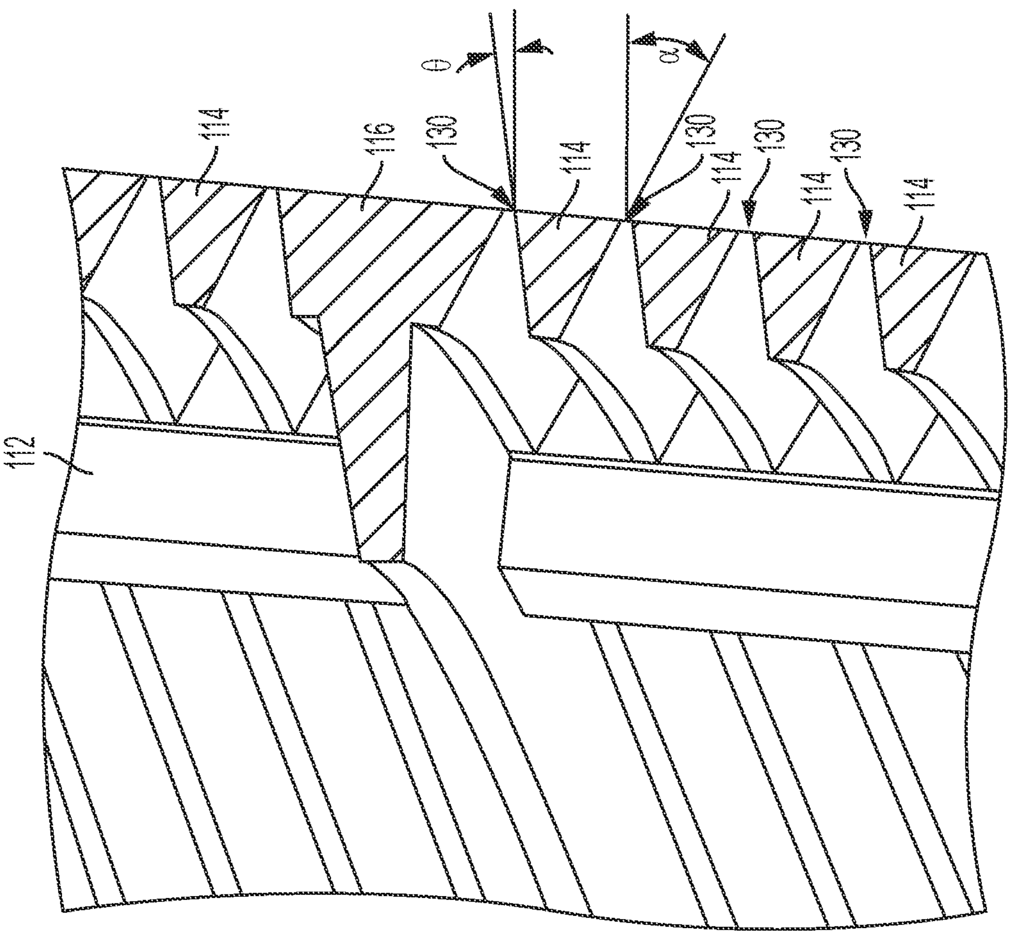
FIG. 10 is an enlarged elevation view of a portion of the top basket assembly shown in FIG. 9.

Turning to FIGS. 9 and 10, fluid flowing radially outwardly through slots 130 of upper basket assembly 110 is also channeled through progressively narrowing area created by neighboring pairs of fins 114. Fins 114 perform similarly to fins 124 described above, and all the performance and structural features of fins 124 also apply to fins 114 except as otherwise described below.

However, with reference to FIG. 10, the upper surface of each fin 114 defines angle Θ while the lower surface of each fin defines angle α. The slot profile of slots 130 is identical to the slots 140 of lower basket in FIG. 12, except the profiles are flipped vertically relative to one another. Angle Θ is a slightly positive angle, relative to horizontal, and may be between 3.6 degrees and 40.5 degrees along the curved slots 130, such as the illustrated 4.8 degrees. Angle α is strongly negative, relative to horizontal, and may be between 23.8 degrees and 48.4 degrees, such as the illustrated 29.3 degrees. These oppositely-sloped angles provide a radially-outward flow from slots 130 during fast rinse and/or upflow brining along direction S as described herein.

Figure 5:
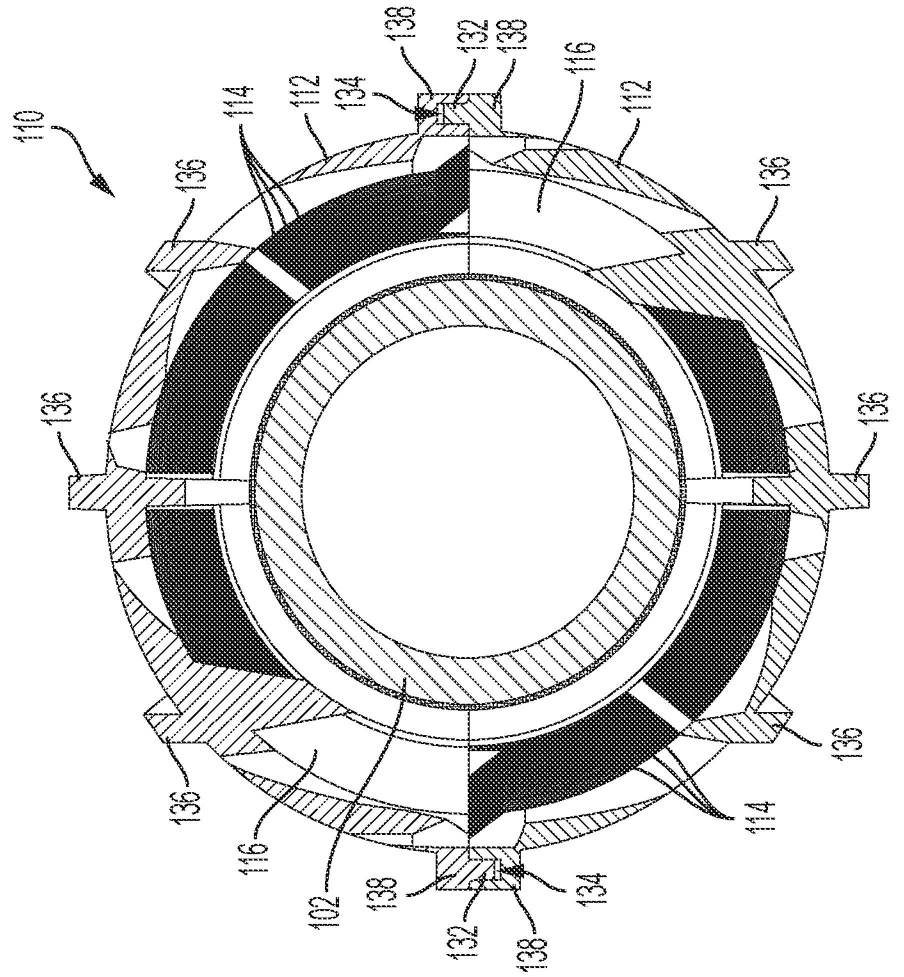
FIG. 5 is a plan, cross-section view illustrating an upper basket assembly of the distributor tube assembly shown in FIG. 2, taken along the line 5-5.

In addition, each half 112 of upper basket assembly 110 includes a large fin 116 which protrudes 2-3 times as far inwardly as fins 114. Large fin 116 induces a significant outward flow of fluid in the upper half of basket assembly 110. However, as shown in FIG. 5, large fin 116 does not protrude further inwardly than the fins 114 at the bottom of basket 110, such that large fin 116 does not constrict overall flow to the bottom half of the basket 110, thereby preserving the ability of the fins 114 to effectively and efficiently channel fluid outwardly as described herein.

Figure 4:
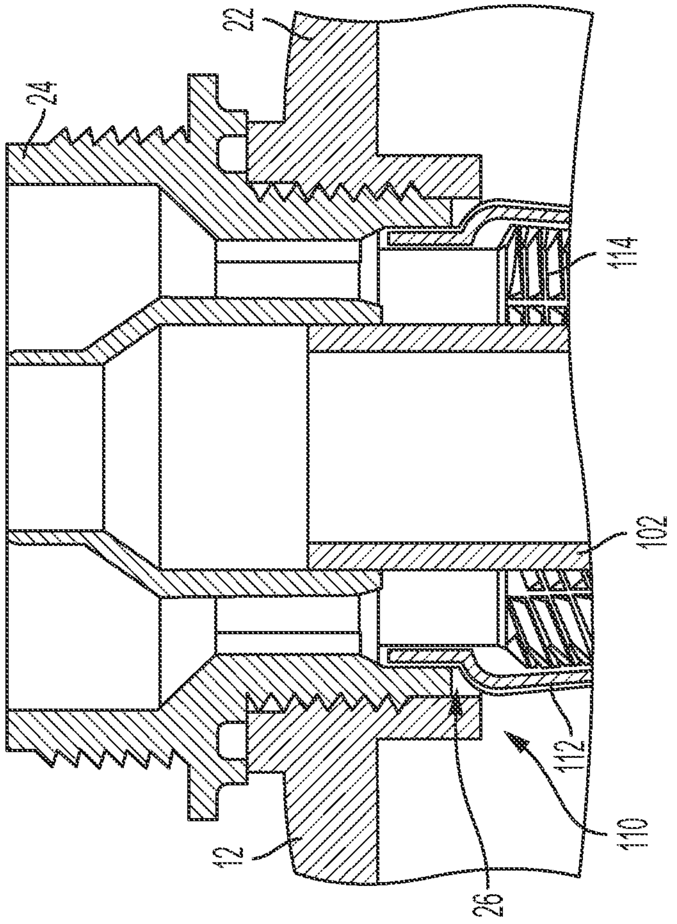
FIG. 4 is an elevation, cross-section view of a top portion of the ion exchange tank and distributor tube assembly shown in FIG. 2.
Figure 6:
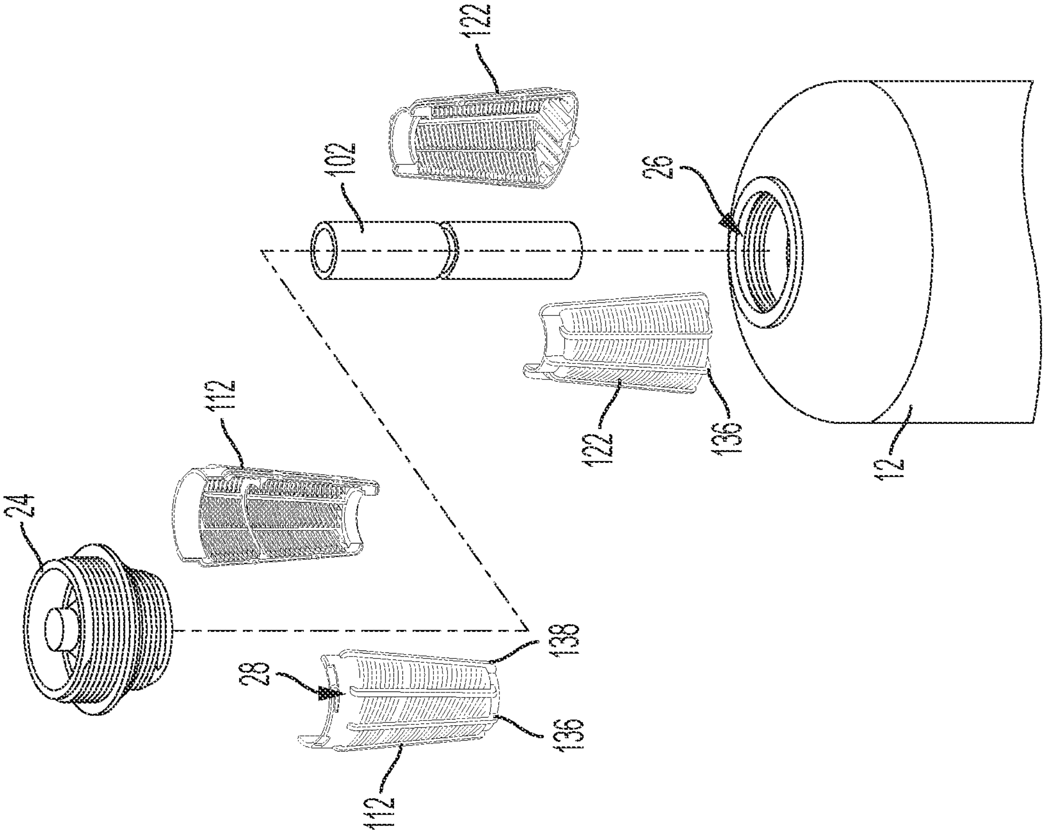
FIG. 6 is a perspective, exploded view of the distributor tube assembly shown in FIG. 2 with associated components.

Advantageously, baskets 110 may be sized to fit through standard-sized openings found in residential-style ion exchange tanks. For example, tank 12 shown in FIG. 6 may have an opening 26 sized to the industry standard, which is 2.5 inches in diameter. As illustrated in FIG. 4, upper basket assembly 110 may have a maximum diameter equal to or smaller than opening 26, such that basket assembly 110 can be passed into and out of the internal cavity of the otherwise sealed tank 12 through the opening 26. Lower basket assembly 120 may also have a maximum diameter equal to or smaller than opening 26 and also be passable through opening 26. This allows distributor tube assembly 100 to be both retrofitted to existing industry-standard tanks 12, as well as installed in new water softener systems, such as system 10 (FIG. 1), using tanks 12 made with high production volume and low cost. Moreover, as described further below, distributor tube assembly 100 still performs as well or better than control systems which use non-removable components. Another advantage of the removability of distributor tube assembly 100 is that it can be serviced or replaced without also replacing the tank 12.

For such "2.5-inch" applications, slots 130 and 140 may have a width between 0.010 and 0.013 inches. The tightness of slots 130, 140 enables the elimination of gravel from the resin tank 12 which reduces weight in shipping, material and sourcing costs as compared to gravel-containing tanks which may use the gravel as a filtration media. The elimination of gravel also potentially allows for more resin 22 in the tank 12, with a corresponding increase hardness removal capacity. Slots 144 in capped lower end (FIG. 8) may be similarly sized. Eliminating gravel facilitates field replacement of lower basket assembly 120, since gravel need not be emptied and replaced to enable the removal and replacement of the basket 120. That is, the gravel occupying the recess at the bottom of the tank where the lower basket 120 is placed poses a barrier to removal and replacement. Removing the gravel means that one could uninstall and reinstall the lower basket without needing to empty the softening tank, while also removing excess pressure from the lower basket assembly 120.

Additionally, the tight widths of slots 130, 140 allow the baskets 110, 120 to be used in iron filtration tanks or other gravel-free systems that use finer particulate filter media. The slot design may be adjusted as required or desired for a particular distributor basket design or application.

Additionally, it is contemplated that distributor tube assemblies and baskets made in accordance with the present disclosure may also be scaled up or down as required or desired for a particular application. For example, in some light commercial applications, a 4-inch diameter opening is provided in typical ion exchange tanks, in which case baskets 110, 120 may be made larger with concomitantly larger features.

The split halves 112 and 122, respectively, facilitate production by injection molding, which provides for efficient and high-tolerance production. In particular, the downwardly-expanding taper design of the lower basket assembly 120 would not be possible with conventional molding techniques, but for its production from halves 122. Each of the halves 112, 122 may be formed of ABS plastic, such as CYCOLAC MG47F ABS material which provides good tensile strength and good moldability and mold flow properties.

Referring to FIGS. 7 and 8, strengthening ribs 136 may be provided on each basket half 112 and similar strengthening ribs 136' may be provided on each basket half 122. Ribs 136, 136' extend axially/longitudinally across most of the outer surfaces of basket halves 112, 122 respectively. Ribs 136, 136' cooperate with joiner ribs 138 to provide structural strength to the finished assemblies 110, 120. In particular, ribs 136, 136', 138, 138' provide crush resistance to withstand the rigors of high-pressure operation which may be experience during service in water softener 10 (FIG. 1). The enhanced structural stability compared to other known distributor baskets also ensures that it can safely operate in systems without gravel without crushing due to static and dynamic loads that may be encountered. For example, baskets 110 and 120 made of MG47F ABS were exposed to 75 psi of fluid pressure, the maximum typically possible in a residential setting. Peak strain was found to be 0.15, less than half of the plastic deformation limit of 0.33, proving that the design and material of baskets 110 and 120 is amply crush-resistant for all expected service conditions.

Water softener system 10 including distributor tube assembly 100 was tested against a control sample of a commercially available, "high performance" water softener system. Results of the testing are illustrated in the attached Exhibits A and B, which show fluid flow rates and various metrics pertaining to salt consumption and mineral removal. As shown in these Exhibits, flow rates through system 10 were comparable to the control system, but salt consumption and mineral removal were significantly enhanced. In particular, grains of hardness mineral removed, per pound of salt consumed, was in excess of 7,300 grains/lb, significantly more than the control system and a very large improvement over a typical environmental standard of 4,500 grains/lb. Moreover, this high level of effectiveness reduces environmental discharge of chloride as a result of water softening, reduces the amount of salt needed for the brine, and reduces the amount of water used per regeneration. These all provide desired environmental benefits.

Figure 13:
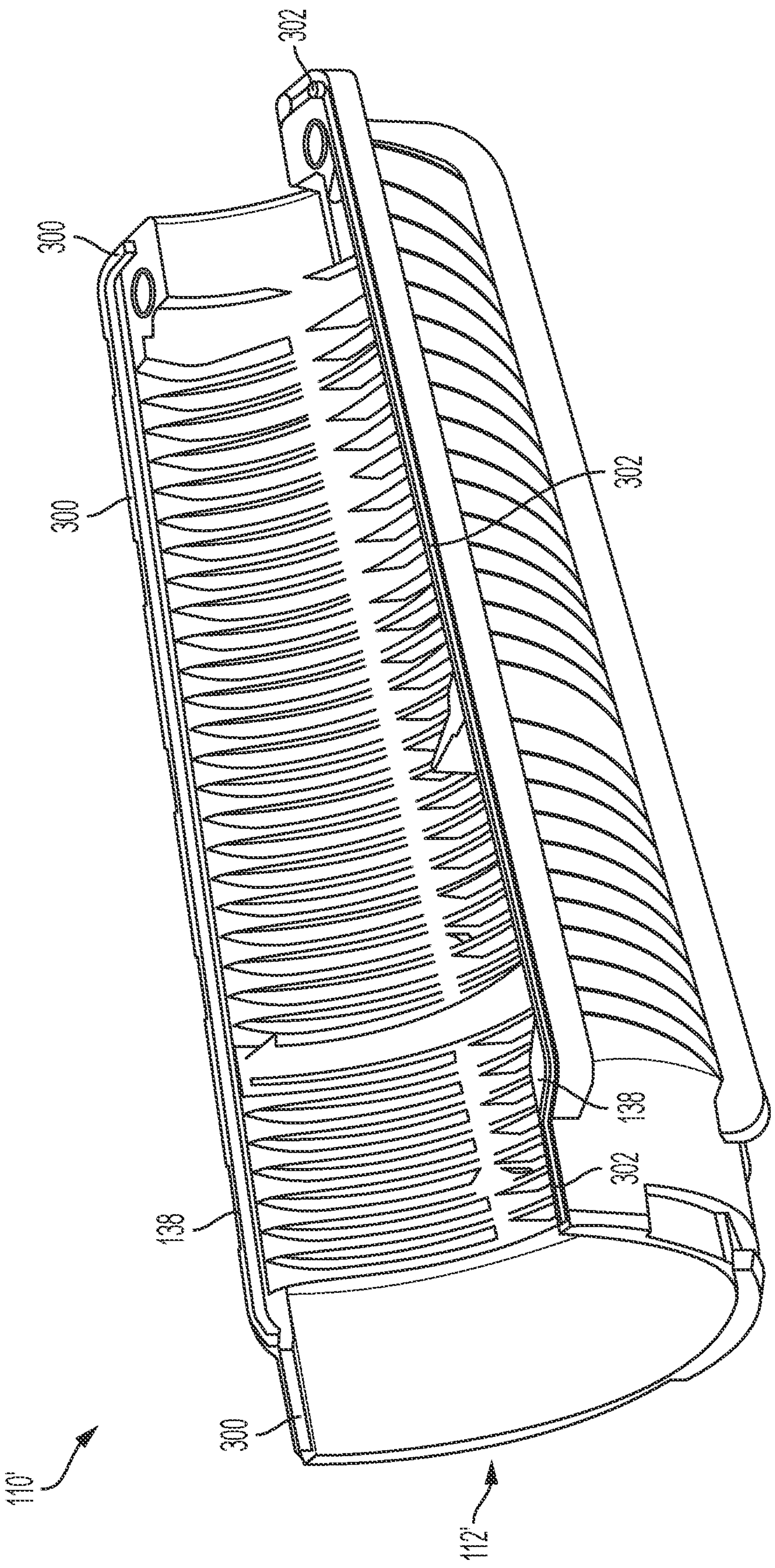
FIG. 13 is a perspective view of one half of an upper basket assembly according to another embodiment of the present disclosure.

Referring now to FIG. 13, one half 112' of another embodiment of an upper basket assembly 110' is shown. A fully assembled upper basket assembly 110' is shown in FIG.

Figure 17:
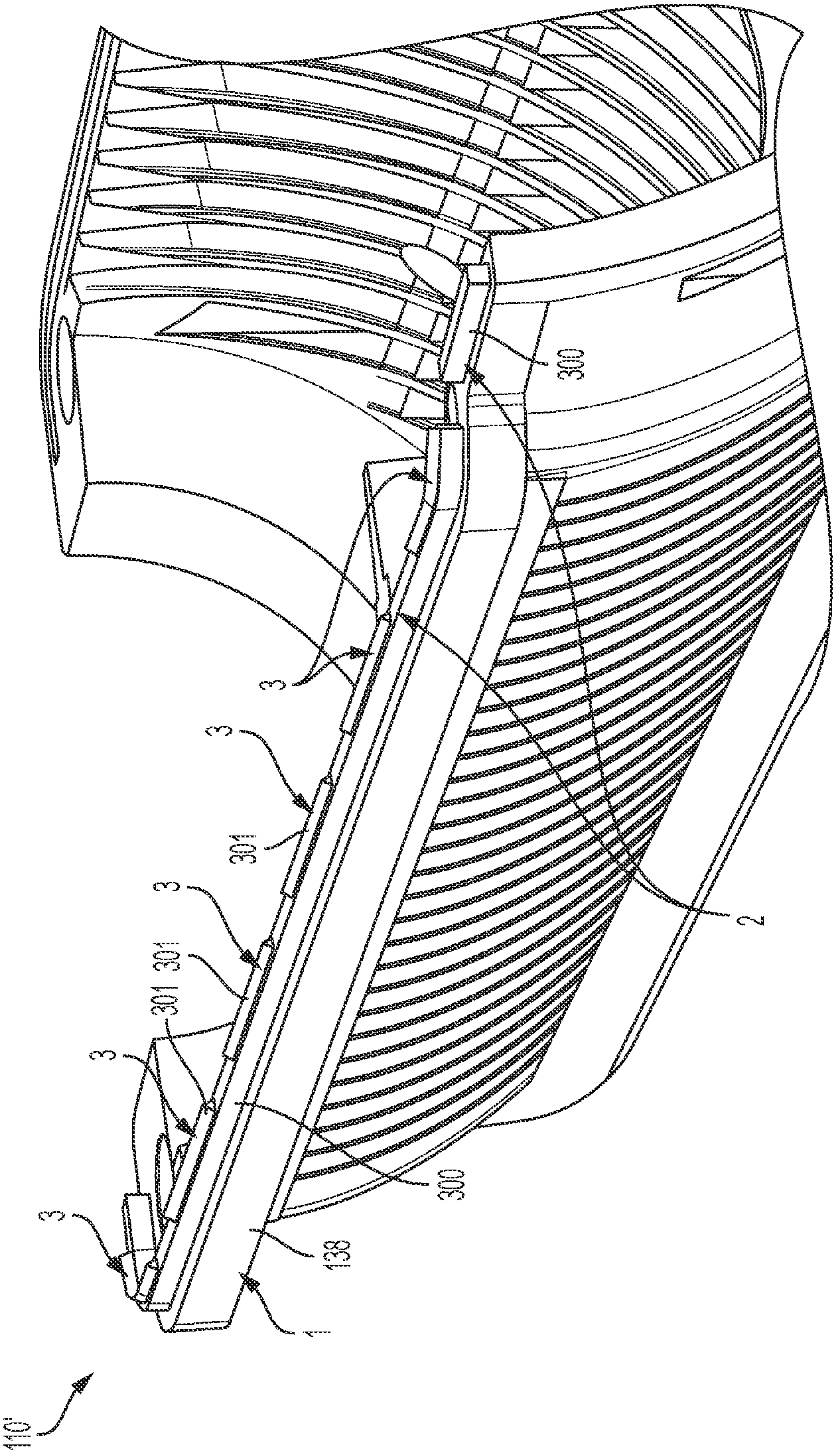
FIG. 17 is a perspective view of a portion of the one half of an upper basket assembly of FIG. 13.

15. The upper basket half 112' is substantially identical to the half 112 of the upper basket assembly 110 described above, except it and its mating half include tongue and groove alignment features. As such, a description of the common features is not included here to simplify the description. More specifically, instead of the alignment pins 132 formed on the joiner ribs 138, which fit into the holes 134 of the other abutting half of the above-described upper basket assembly 110, the halves 112' of this embodiment include a plurality of ribs or tongues 300 along one joiner rib 138 and a plurality of grooves 302 along the other joiner rib 138. As best shown in FIG. 17, the ribs 138 or tongues 300 may also include a series of energy directors 301 that are crested upon the abutting surface of the ribs 138 or tongues 300. The energy directors 301 are interference material displaced during the ultrasonic welding process to join the two halves 112' together into a full upper basket assembly 110'. While multiple tongues 300 and grooves 302 are shown in this example, it should be understood that in certain embodiments one tongue 300 and one groove 302 may be used. In other embodiments, more or fewer tongues 300 and grooves 302 may be used. When the halves 112' of this embodiment are abutted together to create the basket assembly 110', the tongues 300 from one half 112' fit into the grooves 302 of the other abutting half 112'. This creates an integrated alignment feature to ensure dimensional accuracy and stability of the finished basket assembly 110' during the joining (e.g., welding) process.

Figure 14:
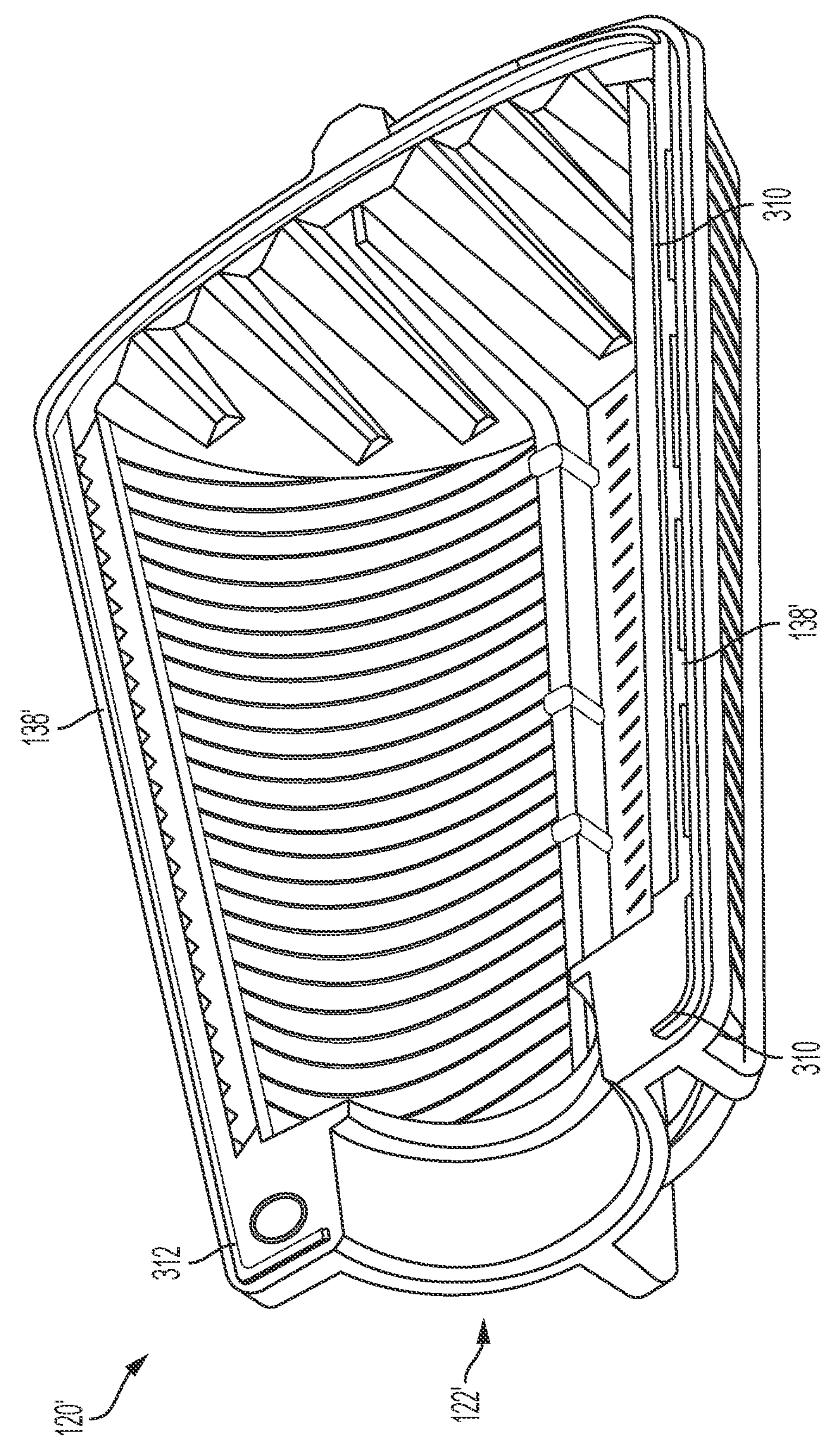
FIG. 14 is a perspective view of one half of a lower basket assembly according to another embodiment of the present disclosure.
Figure 15:
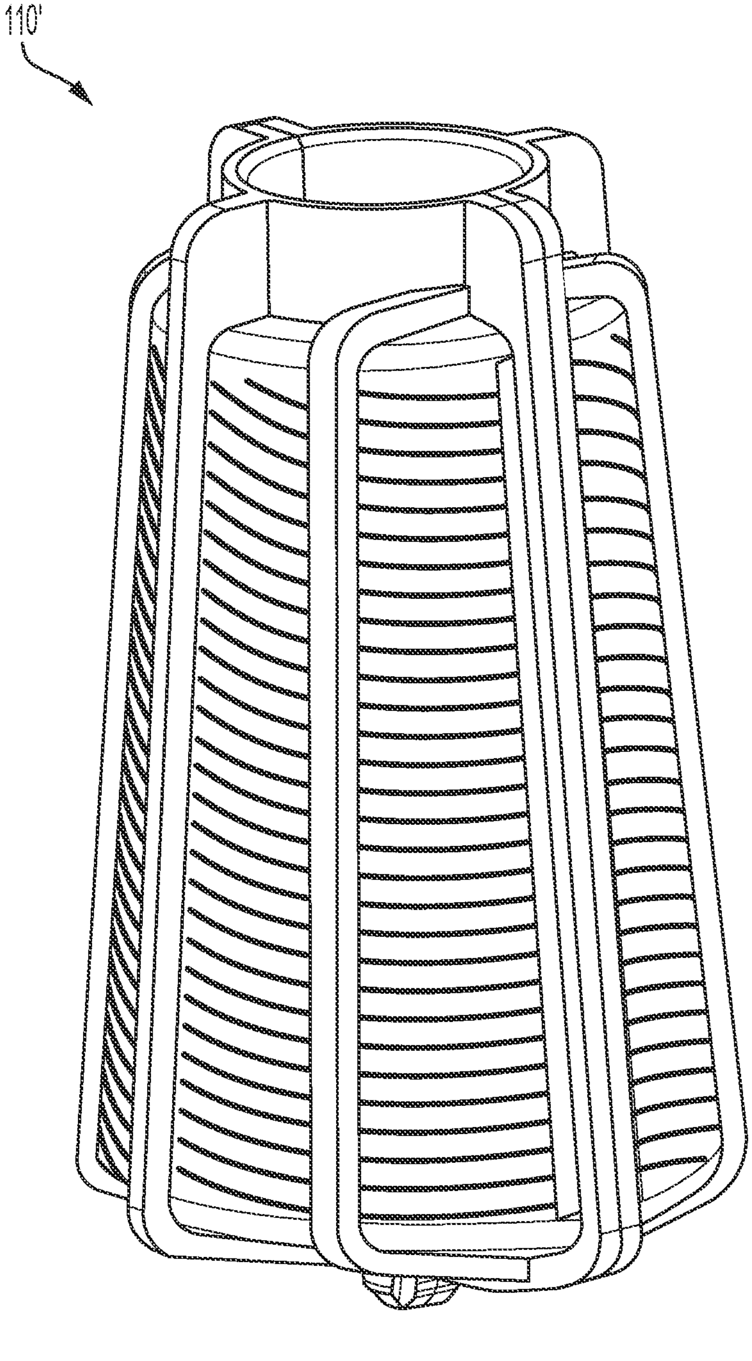
FIG. 15 is a perspective view of a fully assembled upper basket assembly including two of the halves depicted in FIG. 13.
Figure 16:
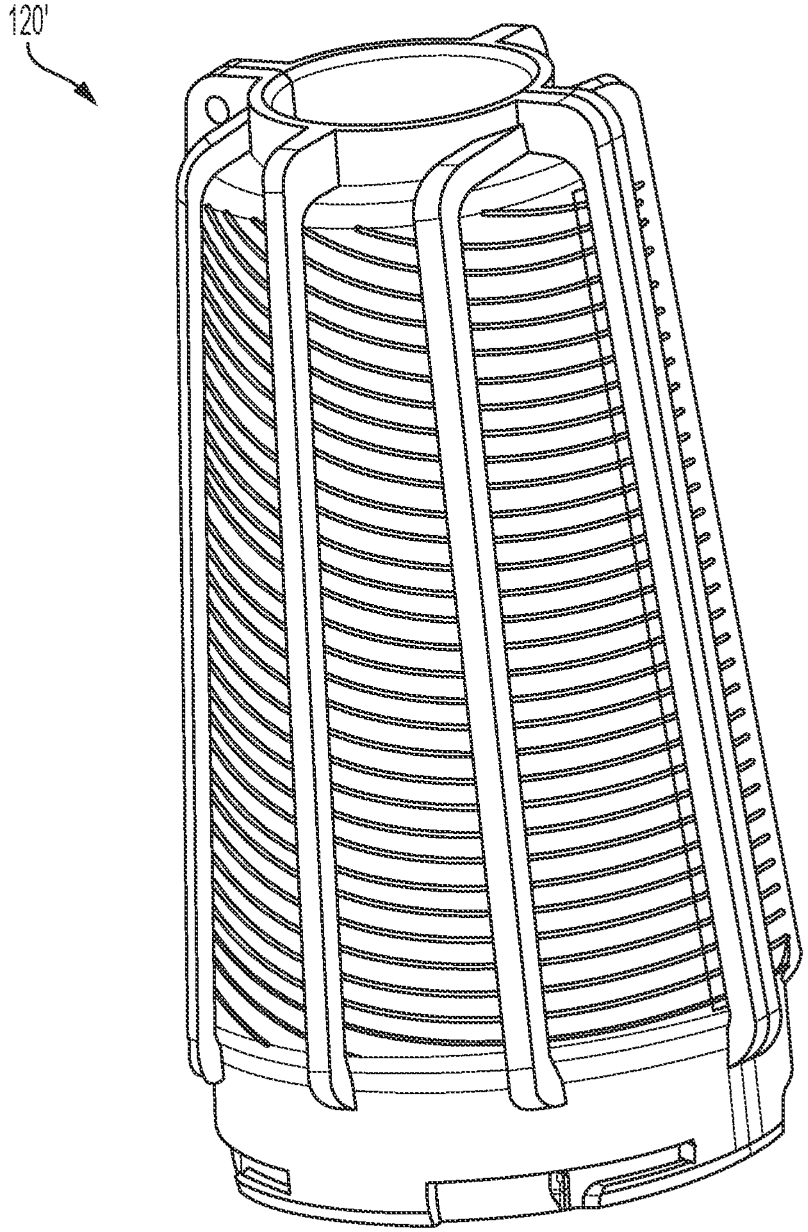
FIG. 16 is a perspective view of a fully assembled lower basket assembly including two of the halves depicted in FIG. 14.

Referring now to FIG. 14, one half 122' of another embodiment of a lower basket assembly 120' is shown. A fully assembled lower basket assembly 120' is shown in FIG. 16. The upper basket half 122' is substantially identical to the half 122 of the upper basket assembly 120 described above, except it and its mating half include tongue and groove alignment features. As such, a description of the common features is not included here to simplify the description. More specifically, instead of the alignment pins 132' formed on the joiner ribs 138', which fit into the holes 134' of the other abutting half of the above-described upper basket assembly 120, the halves 122' of this embodiment include a plurality of ribs or tongues 310 along one joiner rib 138' and a plurality of grooves 312 along the other joiner rib 138'. The ribs 138' or tongues 310 may also include a series of energy directors 301 that are crested upon the abutting surface of the ribs or tongues 310 as shown in FIG. 17. The energy directors 301 are interference material displaced during the ultrasonic welding process to join two halves 122' together into a full upper basket assembly 120'. While multiple tongues 310 and grooves 312 are shown in this example, it should be understood that in certain embodiments one tongue 310 and one groove 312 may be used. In other embodiments, more or fewer tongues 310 and grooves 312 may be used. When the halves 122' of this embodiment are abutted together to create the basket assembly 120', the tongues 310 from one half 122' fit into the grooves 312 of the other abutting half 122'. This creates an integrated alignment feature to ensure dimensional accuracy and stability of the finished basket assembly 120' during the joining (e.g., welding) process.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A distributor basket comprising:

a first basket half having a first plurality of slots arranged in a spiral pattern; and a second basket half having a second plurality of slots arranged in the spiral pattern, the first basket half and the second basket half each having respective mating edges which, when abutted to one another upon assembly, form an assembled basket with a tapered outer surface and a correspondingly tapered inner cavity;

wherein the slots are arranged in a predominantly side-to-side orientation, such that a majority of the slots on each of the first and second halves extend around the tapered outer surface from one of the mating edges to the other of the mating edges.

2. The distributor basket of claim 1, wherein the first basket half and the second basket half are identical.

3. The distributor basket of claim 1, wherein the tapered outer surface defines a generally frustoconical surface and the tapered inner cavity defines a generally frustoconical cavity.

4. The distributor basket of claim 1, wherein the mating edges of the first and second basket halves each include a joiner rib configured to abut one another upon assembly.

5. The distributor basket of claim 4, wherein each joiner rib is formed from a weldable plastic material.

6. The distributor basket of claim 4, wherein each joiner rib includes at least one sonic welding concentrators along a longitudinal extent thereof.

7. The distributor basket of claim 4, wherein:

one of the joiner ribs formed on each of the first and second halves includes at least one alignment pin; and the other of the joiner ribs formed on each of the first and second halves includes at least one alignment hole, the at least one alignment pin sized to be received in the at least one alignment hole upon assembly of the first basket half to the second basket half.

8. The distributor basket of claim 4, wherein:

one of the joiner ribs formed on each of the first and second halves includes at least one tongue; and the other of the joiner ribs formed on each of the first and second halves includes at least one groove, the at least one tongue sized to be received in the at least one groove upon assembly of the first basket half to the second basket half.

9. The distributor basket of claim 8, wherein the at least one tongue includes at least one energy director to provide interference material that is displaced during an ultrasonic welding process.

10. The distributor basket of claim 1, wherein the assembled basket is a lower basket in which the tapered outer surface is downwardly expanding.

11. The distributor basket of claim 10, wherein the lower basket has an upper opening and a capped lower end.

12. The distributor basket of claim 11, wherein the capped lower end includes a plurality of downwardly-facing slots formed therein.

13. The distributor basket of claim 10, wherein the first basket half and the second basket half each include a plurality of fins, each of the plurality of fins having an upwardly angled top surface and an upwardly angled bottom surface, wherein neighboring pairs of the plurality of fins define a narrowing fluid channel extending from the tapered inner cavity toward a respective one of the first or second plurality of slots.

14. The distributor basket of claim 13, wherein:

the upwardly angled top surface defines an angle that varies along a curve of the spiral pattern of the first and second pluralities of slots between 3.6 degrees and 40.5 degrees relative to horizontal; and the upwardly angled bottom surface defines an angle that varies along the curve between 23.8 degrees and 48.4 degrees relative to horizontal.

15. The distributor basket of claim 10, wherein a top half of the first and second pluralities of slots defines a first cumulative fluid-flow area, and a bottom half of the first and second pluralities of slots defines a second cumulative fluid-flow area smaller than the first cumulative fluid-flow area.

16. The distributor basket of claim 1, wherein the first basket half and the second basket half each include at least one strengthening rib extending axially/longitudinally across most of the tapered outer surface.

17. A distributor basket comprising:

a first basket half having a first plurality of slots arranged in a spiral pattern; and a second basket half having a second plurality of slots arranged in the spiral pattern, the first basket half and the second basket half each having respective mating edges which, when abutted to one another upon assembly, form an assembled basket with a tapered outer surface and a correspondingly tapered inner cavity;

wherein the assembled basket is an upper basket in which the tapered outer surface is upwardly expanding.

18. The distributor basket of claim 17, wherein the upper basket has an upper opening and a lower opening.

19. The distributor basket of claim 18, wherein the first basket half and the second basket half each include a plurality of fins, each of the plurality of fins having an upwardly angled top surface and a downwardly angled bottom surface, wherein neighboring pairs of the plurality of fins define a narrowing fluid channel extending from the tapered inner cavity toward a respective one of the first or second plurality of slots.

20. The distributor basket of claim 19, wherein:

the upwardly angled top surface defines an angle that varies along a curve of the spiral pattern of the first and second pluralities of slots between 3.6 degrees and 40.5 degrees relative to horizontal; and the downwardly angled bottom surface defines an angle that varies along the curve between 23.8 degrees and 48.4 degrees relative to horizontal.

21. A distributor tube assembly for a water softener, the assembly comprising:

an upper basket having an open lower end and an open upper end, the upper basket defining a tapered outer profile upwardly expanding from the open lower end toward the open upper end;

a distributor tube having an upper tube end portion coupled to the open lower end of the upper basket and a lower tube end portion opposite the upper tube end portion; and a lower basket having an open upper end and a capped lower end, the lower tube end portion coupled to the open upper end of the lower basket, the lower basket defining a tapered outer profile downwardly expanding from the open upper end of the lower basket to the capped lower end.

22. The distributor tube assembly of claim 21, wherein the capped lower end comprises a series of downwardly-facing slots configured to spray fluid toward an adjacent bottom surface of an ion exchange tank.

23. The distributor tube assembly of claim 22, wherein the capped lower end includes a series of bottom ribs defining angled surfaces tapering toward respective ones of the series of downwardly-facing slots.

24. The distributor tube assembly of claim 23, wherein the capped lower end comprises a bottom spacer protruding downwardly from the series of downwardly-facing slots, the bottom spacer configured to hold the series of downwardly-facing slots above the adjacent bottom surface of the ion exchange tank.

25. A water softener system, comprising:

an ion exchange tank having an upper tank end with a tank opening and a closed lower tank end;

a controller fluidly connected to the ion exchange tank;

a brine tank in selective fluid communication with the ion exchange tank via the controller; and a distributor tube assembly comprising:

a distributor tube having an upper tube end portion and a lower tube end portion;

an upper basket coupled to the upper tube end, the upper basket sized to be passed through the tank opening, the upper basket having a first plurality of slots arranged in a spiral pattern; and a lower basket coupled to the lower tube end, the lower basket sized to be passed through the tank opening, the lower basket having a second plurality of slots arranged in a spiral pattern and a third plurality of slots arranged along a lower surface thereof.

* * * * *